(12) United States Patent
Davydov et al.

(10) Patent No.: US 11,006,429 B2
(45) Date of Patent: May 11, 2021

(54) ANTENNA PANEL SWITCHING AND BEAM INDICATION

(71) Applicant: Apple Inc., Cupertino, CA (US)

(72) Inventors: Alexei Vladimirovich Davydov, Nizhny Novgorod (RU); Gregory Vladimirovich Morozov, Nizhny Novgorod (RU); Victor Sergeev, Nizhny Novgorod (RU); Wook Bong Lee, San Jose, CA (US); Yuan Zhu, Beijing (CN)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 16/098,792

(22) PCT Filed: May 4, 2017

(86) PCT No.: PCT/US2017/031119
§ 371 (c)(1),
(2) Date: Nov. 2, 2018

(87) PCT Pub. No.: WO2017/192889
PCT Pub. Date: Nov. 9, 2017

(65) Prior Publication Data
US 2019/0132851 A1    May 2, 2019

Related U.S. Application Data

(60) Provisional application No. 62/455,191, filed on Feb. 6, 2017, provisional application No. 62/331,736, filed on May 4, 2016.

(51) Int. Cl.
*H04W 72/08* (2009.01)
*H04B 7/08* (2006.01)
(Continued)

(52) U.S. Cl.
CPC ............ *H04W 72/082* (2013.01); *H04B 7/06* (2013.01); *H04B 7/08* (2013.01); *H04B 7/088* (2013.01);
(Continued)

(58) Field of Classification Search
None
See application file for complete search history.

(56) References Cited

U.S. PATENT DOCUMENTS

2014/0323143 A1    10/2014    Jung et al.

FOREIGN PATENT DOCUMENTS

| WO | WO-2015157565 A1 | 10/2015 |
|----|------------------|---------|
| WO | WO-2017192889 A1 | 11/2017 |

OTHER PUBLICATIONS

"International Application Serial No. PCT/US2017/031119, International Search Report dated Aug. 14, 2017", 3 pgs.
(Continued)

*Primary Examiner* — James P Duffy
(74) *Attorney, Agent, or Firm* — Kowert, Hood, Munyon, Rankin & Goetzel, P.C.

(57) ABSTRACT

Devices and methods of joint antenna panel switching and beam selection are generally described. A user equipment (UE) can be configured to decode configuration information received via a higher layer for a plurality of receive (Rx) beams for the UE, the configuration information identifying a plurality of Rx beam indices for the plurality of Rx beams. The UE is configured to decode a physical layer (PHY) communication indicating an antenna panel index and an Rx beam index of the plurality of Rx beam indices, the antenna panel index identifying an antenna panel of a plurality of available antenna panels of the UE. The UE is configured to decode a downlink (DL) data transmission, wherein the DL data transmission is received using the antenna panel and a
(Continued)

selected Rx beam of the plurality of Rx beams corresponding to the indicated Rx beam index.

25 Claims, 14 Drawing Sheets

(51) Int. Cl.
| | | |
|---|---|---|
| | *H04B 7/06* | (2006.01) |
| | *H04L 5/00* | (2006.01) |
| | *H04W 72/04* | (2009.01) |
| | *H04B 7/0408* | (2017.01) |
| | *H04W 72/14* | (2009.01) |

(52) U.S. Cl.
CPC ......... *H04B 7/0862* (2013.01); *H04B 7/0874* (2013.01); *H04L 5/0053* (2013.01); *H04W 72/0413* (2013.01); *H04W 72/0446* (2013.01); *H04B 7/0408* (2013.01); *H04B 7/0626* (2013.01); *H04W 72/14* (2013.01)

(56) References Cited

OTHER PUBLICATIONS

"International Application Serial No. PCT/US2017/031119, Written Opinion dated Aug. 14, 2017", 6 pgs.
"Overview of antenna technology for new radio interface", R1162380 3GPP TSGRAN tYG1 84his Busan Korea, (Apr. 2, 2016).
Nokia, et al., "MIMO and Beamforming for 5G New Radio", R1162901 3GPP TSGRAN VGI 84his Busan Korea, (Apr. 1, 2016).
Samsung, "MIMO/beamforming for 5G new radio interface for over-6GHz: System architecture and design aspects", R1162183 3GPP TSG RAN WG1 84bis Busan Korea, (Apr. 1, 2016).

ANTENNA PANEL SWITCHING AND BEAM INDICATION

PRIORITY CLAIM

This application is a U.S. National Stage Application under 35 U.S.C. 371 from International Application No. PCT/US2017/031119, filed May 4, 2017, which claims the benefit of priority to U.S. Provisional Patent Application Ser. No. 62/331,736, filed May 4, 2016, and entitled "JOINT PANEL SWITCHING AND BEAM INDICATION FOR NR," and to U.S. Provisional Patent Application Ser. No. 62/455,191, filed Feb. 6, 2017, and entitled "TX-RX PANEL SWITCHING." Each of which are incorporated herein by reference in their entireties.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and fifth-generation (5G) networks including new radio (NR) networks. Other embodiments are directed to measurement reporting with number of available beams in beamforming systems.

BACKGROUND

Mobile data usage continues growing exponentially at a rate of nearly doubling year-after-year, and this trend is expected to continue. Although recent advances in cellular technology have made improvements in the performance and capacity of mobile networks, it is widely thought that such advances will still fall short of accommodating the anticipated demand for mobile data network service.

One approach to increasing mobile network capacity is utilizing higher-frequency radio bands. Millimeter-wave communications, for example, use radio frequencies in the range of 30-300 GHz to provide colossal bandwidth by today's standards—on the order of 20 Gb/s, for example. The propagation of millimeter-wave radio signals differs considerably from more familiar radio signals in the 2-5 GHz range. For one, their range is significantly limited by comparison due to attenuation in the atmosphere. In addition, millimeter-wave signals experience blockage, reflections, refractions, and scattering due to walls, buildings and other objects to a much greater extent than lower-frequency signals. These physical challenges also present some useful opportunities for communication system designers. For example, the limited range of millimeter-wave transmissions make them suitable for resource-element (time slot and frequency) reuse in high-density deployments in city blocks, office buildings, schools, stadiums, and the like, where there may be a large plurality of user equipment devices. In addition, the potential for precise directionality control provides opportunity to make extensive use of multi-user multiple input/multiple output (MU-MIMO) techniques. Solutions are needed to make practical use of these opportunities in highly-directional wireless networks.

Millimeter-wave or similar high-frequency communication systems typically employ a directional beamforming at the base station and user equipment in order to achieve a suitable signal-to-noise ratio (SNR) for link establishment and to overcome communication channel blockage issues that are common for 5G/new radio (NR) communications. The use of beamforming in 5G communications results in even higher probability of channel blockage due to narrow beams from the network and/or UE sides. Acquisition/access procedures, which provide the base station and the user equipment a procedure with which to determine the best transmit and receive beamforming directions and antennas, are some of the more important aspects in the design and implementation of millimeter-wave or higher frequency communication systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
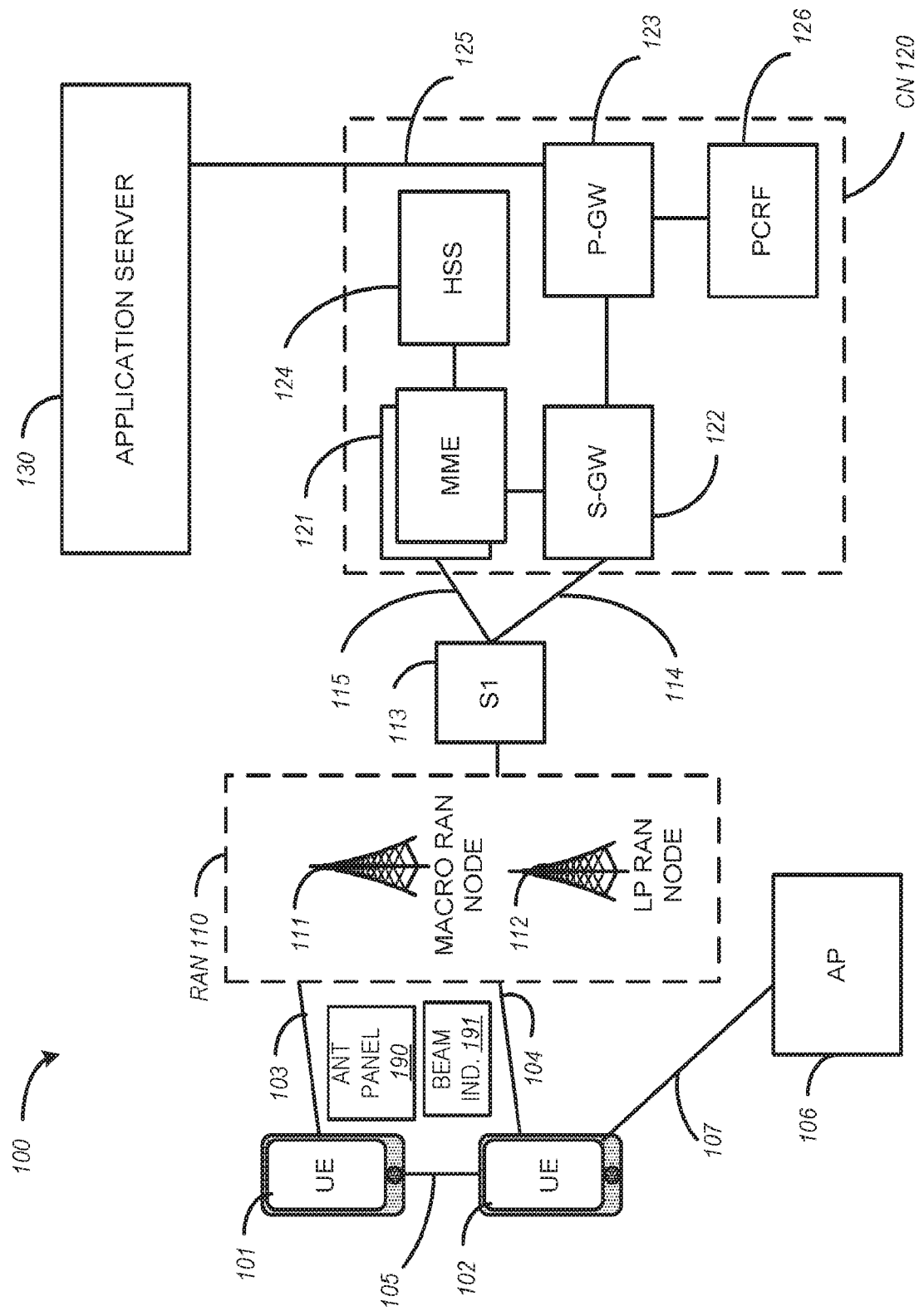
FIG. 1A illustrates an architecture of a network in accordance with some embodiments.

FIG. 1A illustrates an architecture of a network in accordance with some embodiments. The network 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an eveloved node-B (eNB) or another type of RAN node.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

In an example, any of the nodes 111 or 112 can be configured to communicate to the UEs 101/102 (e.g., dynamically) an antenna panel selection and a receive (Rx) beam selection that should be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101/102 (e.g., dynamically) an antenna panel selection and a transmit (Tx) beam selection that should be used by the UE for data transmission on a physical uplink shared channel (PUSCH) as well as for sounding reference signal (SRS) transmission.

Figure 1B:
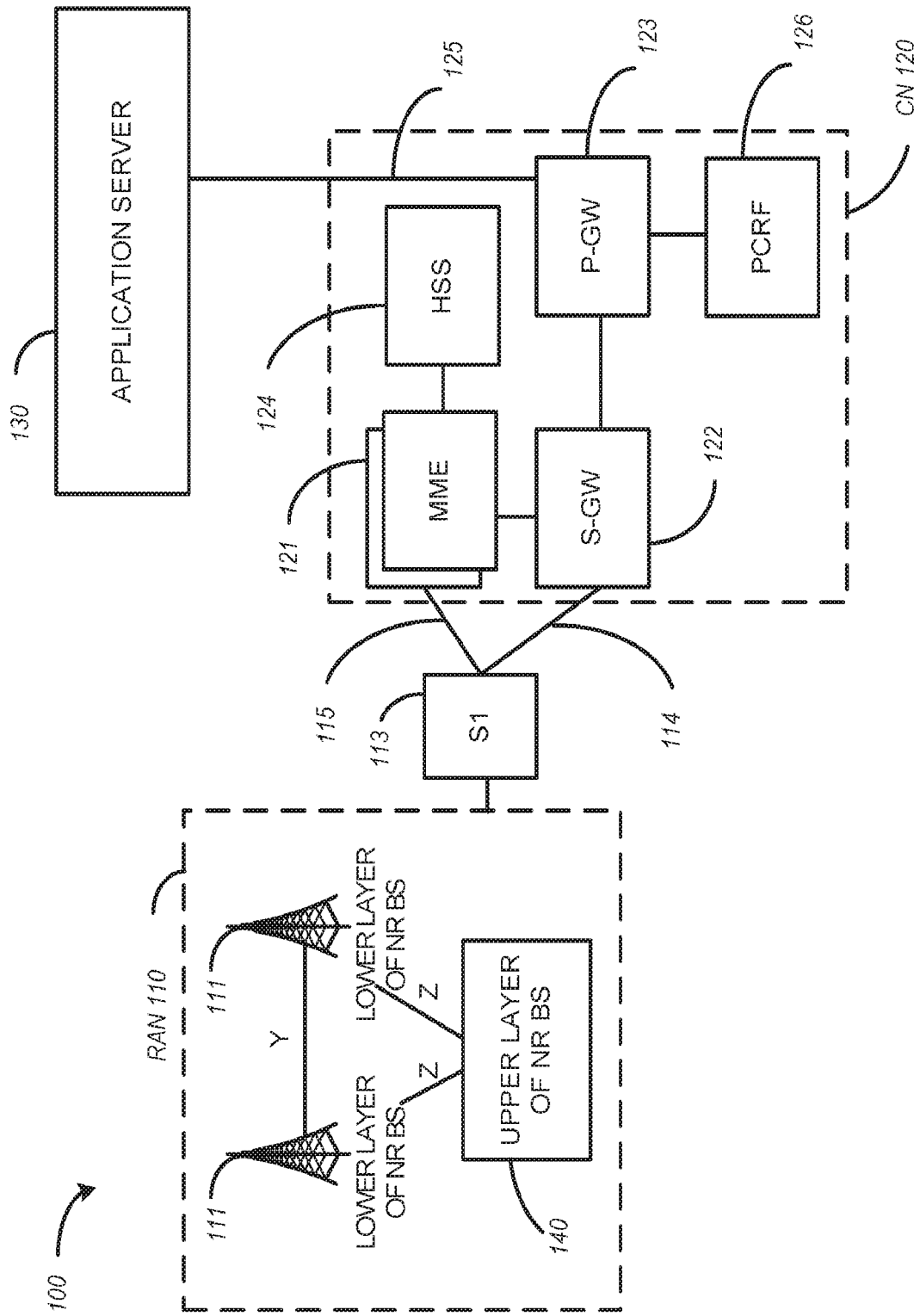
FIG. 1B is a simplified diagram of a next generation wireless network in accordance with some embodiments.

FIG. 1B is a simplified diagram of a next generation wireless network in accordance with some embodiments. The wireless network may be similar to that shown in FIG. 1A but may contain components associated with a 5G network. The wireless network may contain, among other elements not shown, a RAN 110 coupled to the core network 120 (as well as to the Internet which can connect the core network 120 with other core networks 120). In some embodiments, the RAN 110 and the core network 120 may be a next generation (5G) 3GPP RAN and 5G core network, respectively. The RAN 110 may include an upper layer of a new generation node-B (gNB) (also referred to as a new radio (NR) base station (BS) (ULNRBS)) 140 and multiple lower layers of different gNBs (NR BS (LLNRBS)) 111. The LLNRBSs 111 can be connected to the ULNRBS 140 via a Z interface. The Z interface can be open or proprietary. In some examples, the LLNRBS 111 can be referred to as a transmission-reception point (TRP). If the Z interface is proprietary, then the ULNRBS 140 and the LLNRBS 111 may be provided by the same vendor. The LLNRBS 111 can be connected by a Y interface, which may be equivalent to the LTE X2 interface. The ULNRBS 140 may be connected to the core network 120 through the S1 interface 113.

As used herein, the term circuitry may refer to, be part of, or include an Application Specific Integrated Circuit (ASIC), an electronic circuit, a processor (shared, dedicated, or group), or memory (shared, dedicated, or group) that executes one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware or software.

Figure 2:
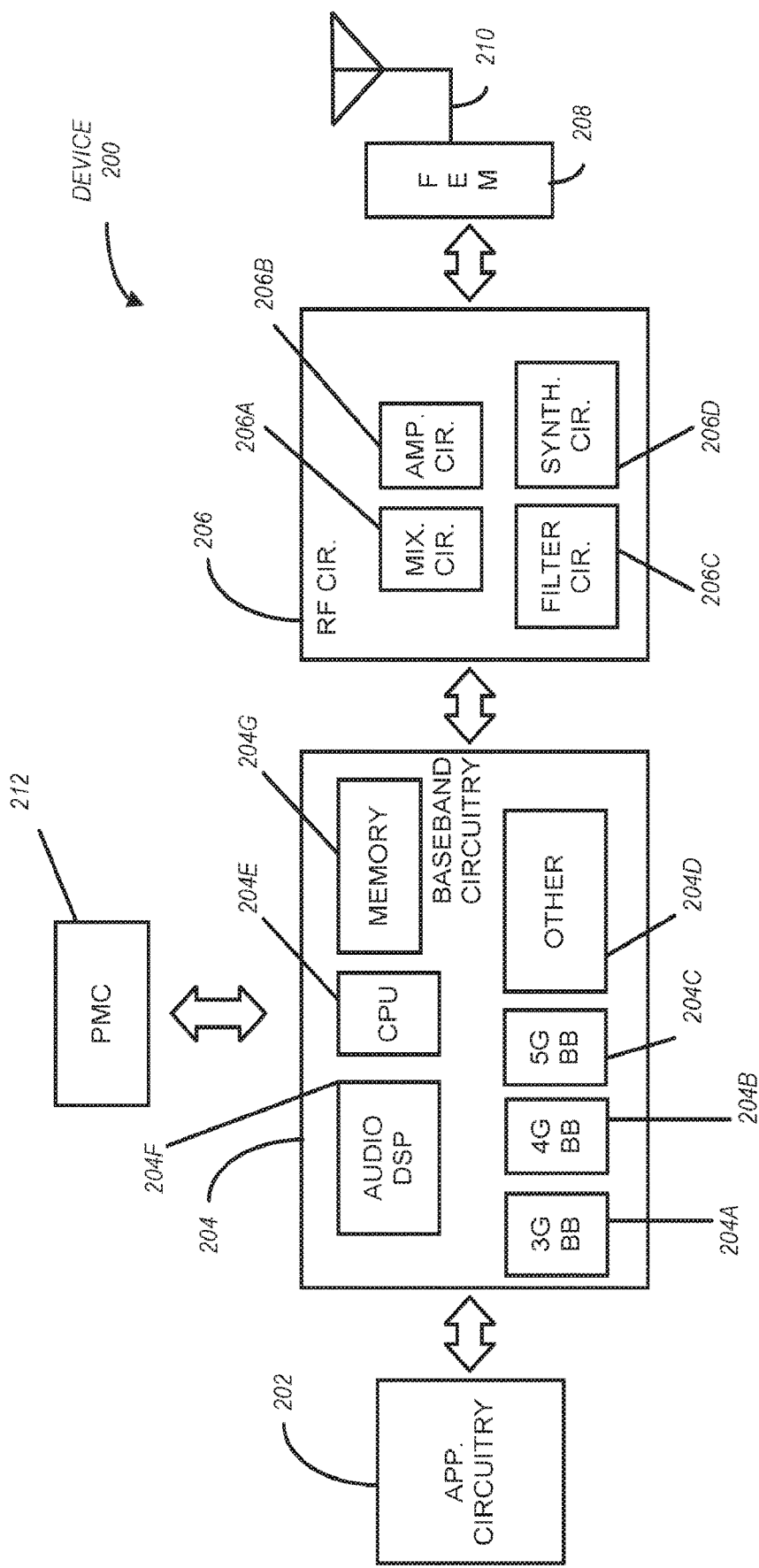
FIG. 2 illustrates example components of a device 200 in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206A, amplifier circuitry 206B and filter circuitry 206C. In some embodiments, the transmit signal path of the RF circuitry 206 may include filter circuitry 206C and mixer circuitry 206A. RF circuitry 206 may also include synthesizer circuitry 206D for synthesizing a frequency for use by the mixer circuitry 206A of the receive signal path and the transmit signal path. In some embodiments, the mixer circuitry 206A of the receive signal path may be configured to down-convert RF signals received from the FEM circuitry 208 based on the synthesized frequency provided by synthesizer circuitry 206D. The amplifier circuitry 206B may be configured to amplify the down-converted signals and the filter circuitry 206C may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206A of the receive signal path may comprise passive mixers, although the scope of the embodiments is not limited in this respect.

In some embodiments, the mixer circuitry 206A of the transmit signal path may be configured to up-convert input baseband signals based on the synthesized frequency provided by the synthesizer circuitry 206D to generate RF output signals for the FEM circuitry 208. The baseband signals may be provided by the baseband circuitry 204 and may be filtered by filter circuitry 206C.

In some embodiments, the mixer circuitry 206A of the receive signal path and the mixer circuitry 206A of the transmit signal path may include two or more mixers and may be arranged for quadrature downconversion and upconversion, respectively. In some embodiments, the mixer circuitry 206A of the receive signal path and the mixer circuitry 206A of the transmit signal path may include two or more mixers and may be arranged for image rejection (e.g., Hartley image rejection). In some embodiments, the mixer circuitry 206A of the receive signal path and the mixer circuitry 206A may be arranged for direct downconversion and direct upconversion, respectively. In some embodiments, the mixer circuitry 206A of the receive signal path and the mixer circuitry 206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206D may be a fractional-N synthesizer or a fractional N/N+1 synthesizer, although the scope of the embodiments is not limited in this respect as other types of frequency synthesizers may be suitable. For example, synthesizer circuitry 206D may be a delta-sigma synthesizer, a frequency multiplier, or a synthesizer comprising a phase-locked loop with a frequency divider.

The synthesizer circuitry 206D may be configured to synthesize an output frequency for use by the mixer circuitry 206A of the RF circuitry 206 based on a frequency input and a divider control input. In some embodiments, the synthesizer circuitry 206D may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206D of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit signal paths or the receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
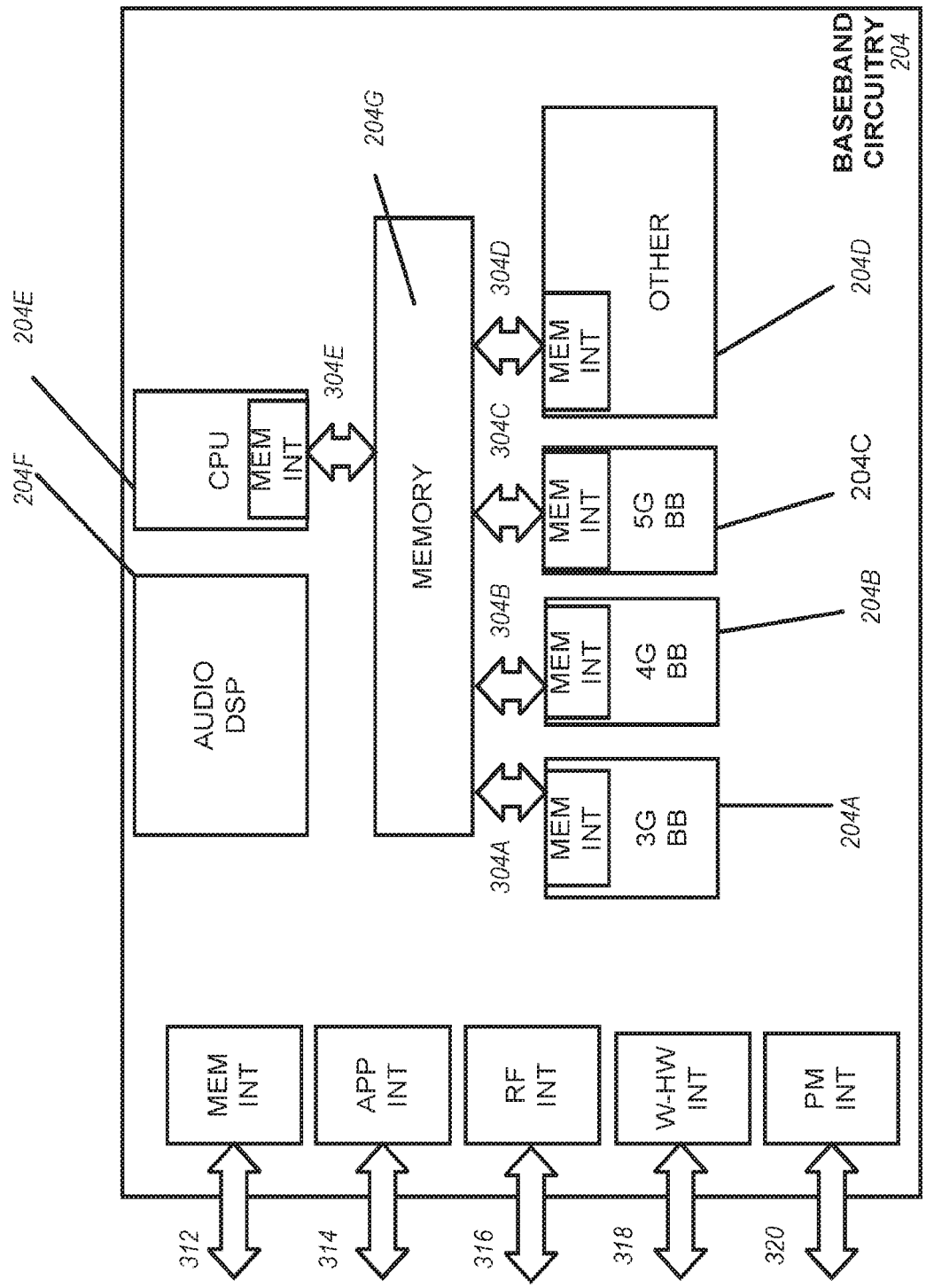
FIG. 3 illustrates example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
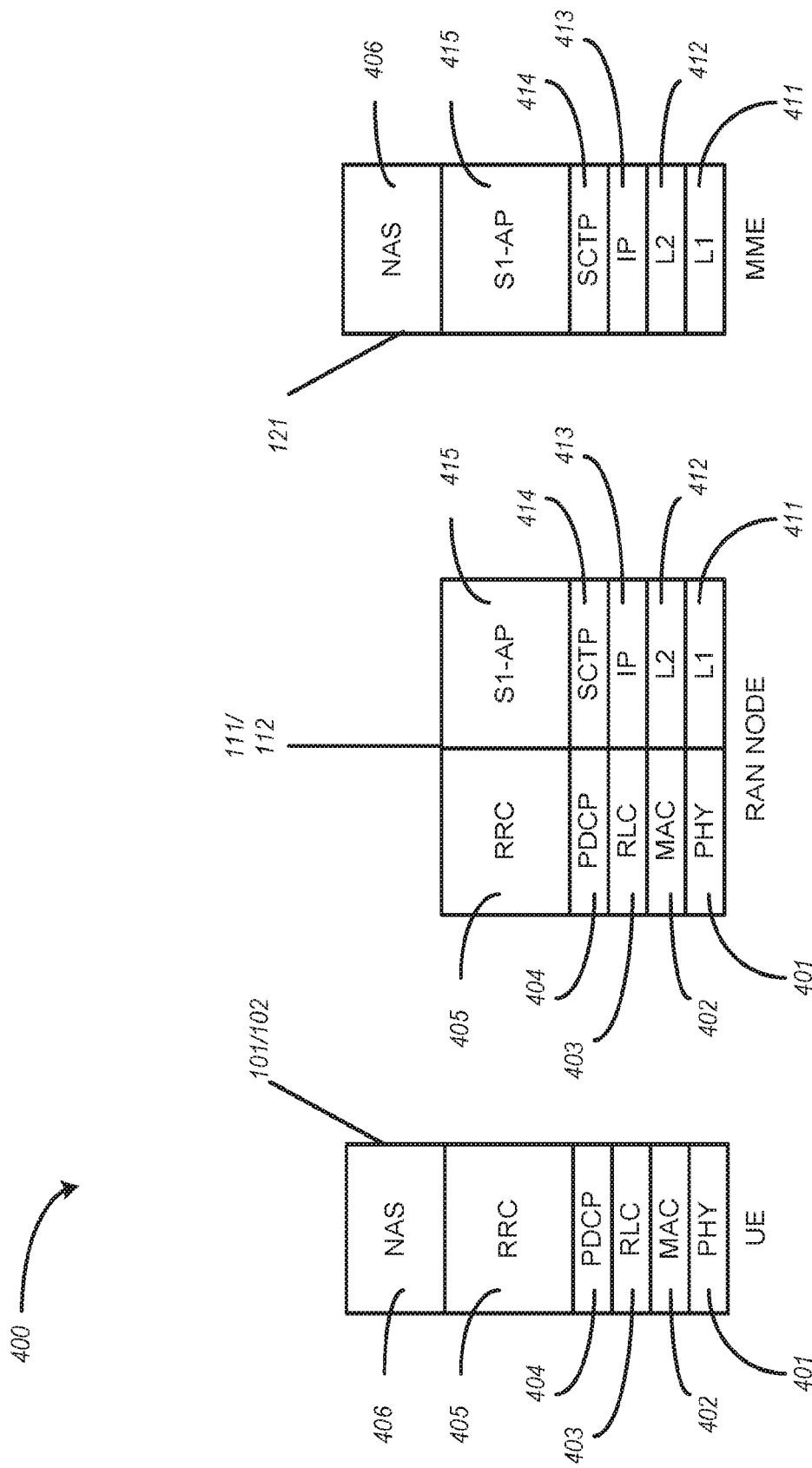
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
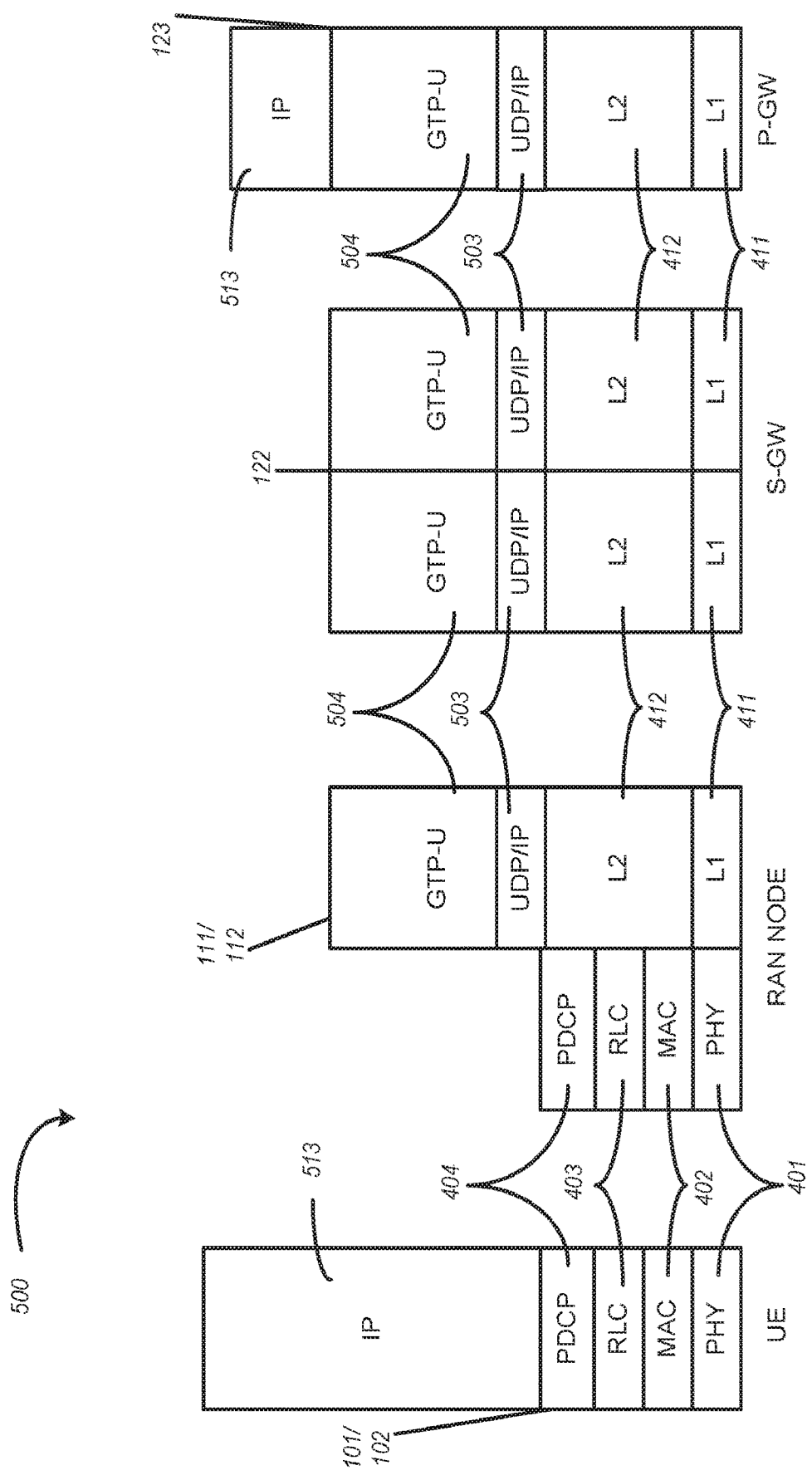
FIG. 5 is an illustration of a user plane protocol stack in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, and the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
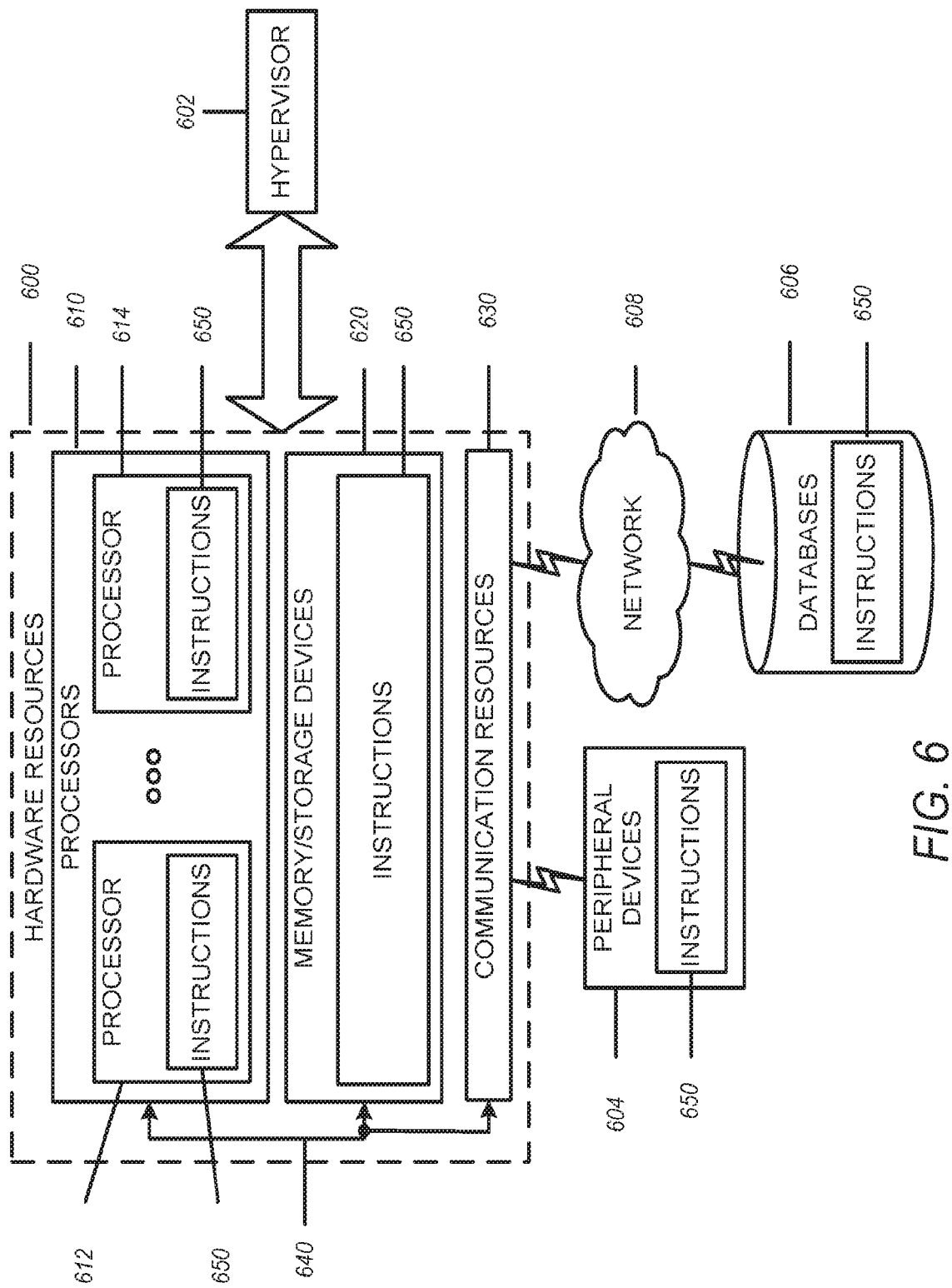
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
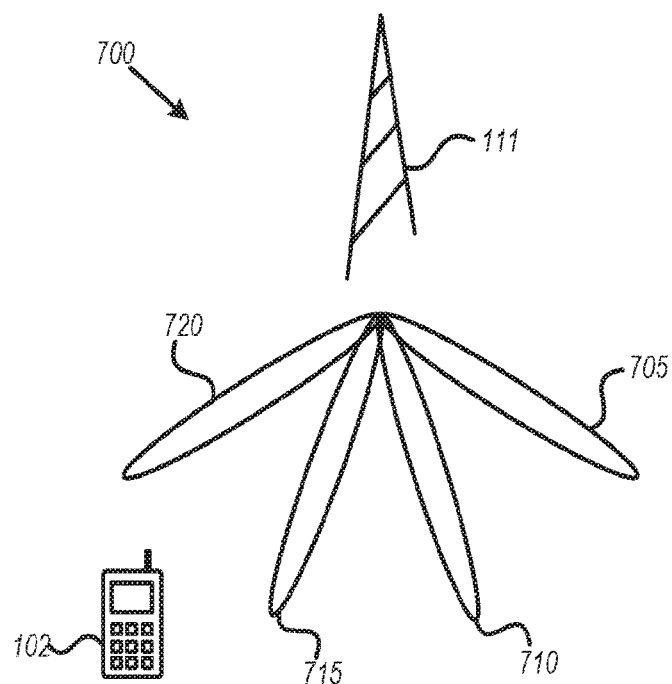
FIG. 7 illustrates examples of multiple beam transmission in accordance with some embodiments.
Figure 7:
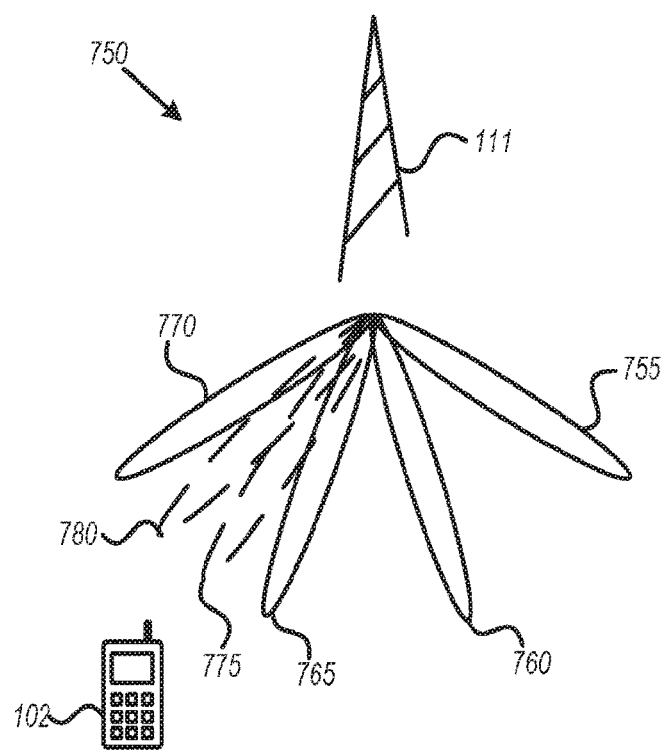

FIG. 7 illustrates examples of multiple beam transmission in accordance with some embodiments. Although the example scenarios 700 and 750 depicted in FIG. 7 may illustrate some aspects of techniques disclosed herein, it will be understood that embodiments are not limited by example scenarios 700 and 750. Embodiments are not limited to the number or type of components shown in FIG. 7 and are also not limited to the number or arrangement of transmitted beams shown in FIG. 7.

In example scenario 700, the eNB 111 may transmit a signal on multiple beams 705-720, any or all of which may be received at the UE 102. It should be noted that the number of beams or transmission angles as shown are not limiting. As the beams 705-720 may be directional, transmitted energy from the beams 705-720 may be concentrated in the direction shown. Therefore, the UE 102 may not necessarily receive a significant amount of energy from beams 705 and 710 in some cases, due to the relative location of the UE 102.

UE 102 may receive a significant amount of energy from the beams 715 and 720 as shown. As an example, the beams 705-720 may be transmitted using different reference signals, and the UE 102 may determine channel-state information (CSI) feedback or other information for beams 715 and 720. In some embodiments, each of beams 705-420 are configured as CSI reference signals (CSI-RS). In related embodiments, the CSI-RS signal is a part of the discovery reference signaling (DRS) configuration. The DRS configuration may serve to inform the UE 102 about the physical resources (e.g., subframes, subcarriers) on which the CSI-RS signal will be found. In related embodiments, the UE 102 is further informed about any scrambling sequences that are to be applied for CSI-RS.

In an example, up to 2 MIMO layers may be transmitted within each beam by using different polarizations. More than 2 MIMO layers may be transmitted by using multiple beams. In an example, the UE is configured to discover the available beams and report those discovered beams to the eNB prior to the MIMO data transmissions using suitable reporting messaging. Based on the reporting messaging, the eNB 104 may determine suitable beam directions for the MIMO layers to be used for data communications with the UE 102. In various embodiments, there may be up to 2, 4, 8, 16, 32, or more MIMO layers, depending on the number of MIMO layers that are supported by the eNB 111 and UE 102. In a given scenario, the number of MIMO layers that may actually be used will depend on the quality of the signaling received at the UE 102, and the availability of reflected beams arriving at diverse angles at the UE 102 such that the UE 102 may discriminate the data carried on the separate beams. In an example, the eNB 111 can communicate control signal messaging (e.g., downlink control information, or DCI) with an antenna panel selection and a beam index selection for the UE to use when receiving data (e.g., via PDSCH) or transmitting data (e.g., via PUSCH).

In the example scenario 750, the UE 102 may determine angles or other information (such as CSI feedback/report, including beam index, precoder, channel-quality indicator (CQI) or other) for the beams 765 and 770. The UE 102 may also determine such information when received at other angles, such as the illustrated beams 775 and 780. The beams 775 and 780 are demarcated using a dotted line configuration to indicate that they may not necessarily be transmitted at those angles, but that the UE 102 may determine the beam directions of beams 775 and 780 using such techniques as receive beam-forming, as receive directions. This situation may occur, for example, when a transmitted beam reflects from an object in the vicinity of the UE 102, and arrives at the UE 102 according to its reflected, rather than incident, angle.

In an example, antenna switching in an LTE communication system supports spatial diversity schemes at the UE. The antenna switching can be applied at the UE transmitter (i.e. for uplink communications) and/or at the UE receiver (i.e. for downlink communication). In the antenna switching in the receiving mode, the UE does not process the signals received by all receiving antennas. Instead, the UE can dynamically use the antenna subset that have optimal instantaneous link conditions to the eNB transmitter, and only processes the signals received by those antennas. This technique can enable the receiver to employ smaller number of transceiver units (TXRUs) or radio frequency (RF) chains. Similarly, in transmit antenna switching, the UE transmitter employs smaller number of TXRUs or RF chains than the available number of antennas. For example, for typical uplink implementation of LTE, the UE can be equipped with two antenna elements for the receiving mode (i.e., for downlink communications) and only one antenna element in transmitting mode (i.e., for uplink communications). The smaller number of Tx antenna elements is used to reduce the hardware cost and achieve greater energy efficiency at the UEs. Different number of the transmit and receive antennas in this case makes the antenna switching in the uplink an attractive technology to support diversity schemes in a cost efficient manner.

In an example, LTE uplink transmissions can use antenna switching, which is supported by 1-bit feedback from the eNodeB to indicate to the UE the selected antenna to use for transmitting data. The data can be transmitted on the Physical Uplink Shared Channel (PUSCH). The feedback can be communicated by the eNodeB in the uplink scheduling grant communicated on a control channel. For the SRS transmissions in the uplink, the antenna switching can be supported by specifying the antenna order that should be used for the SRS transmission in a given OFDM symbol. Conventionally, antenna switching for the DL is not supported in LTE.

Figure 8A:
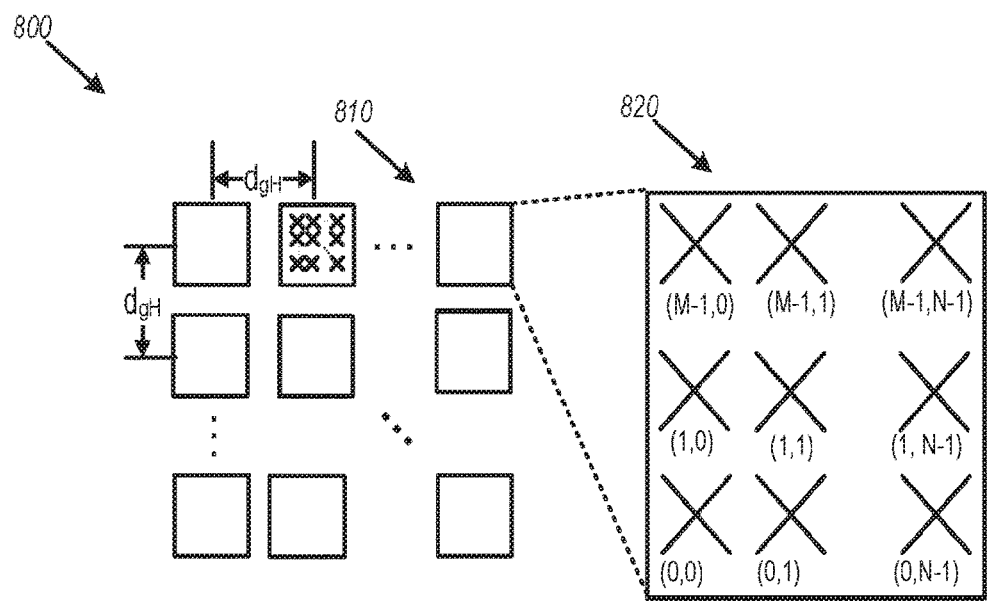
FIG. 8A illustrates an antenna array structure in accordance with some embodiments.

FIG. 8A illustrates an antenna array structure in accordance with some embodiments. Referring to FIG. 8A, there is illustrated an antenna array 800, which can be used in connection with 5G/NR communications. The antenna array 800 may include a plurality of antenna panels 810. Neighboring horizontal panels can be disposed at a first distance (dgH) between each other, and neighboring vertical panels can be disposed at a second distance (dgV) between each other (dgH and dgV can be different or equal to each other for uniform spacing). Each of the antenna panels 810 can include a plurality of dual-polarized antennas 820.

Figure 8B:
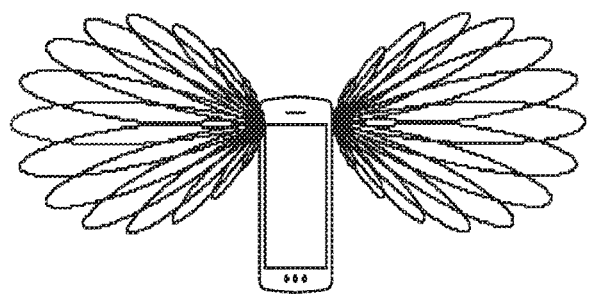
FIG. 8B illustrates example antenna patterns for multiple antenna panels at a user equipment (UE) in accordance with some embodiments.

FIG. 8B illustrates example antenna patterns for multiple antenna panels at a user equipment (UE) in accordance with some embodiments. Referring to FIG. 8B, there are illustrated antenna patterns 850, which can be generated using two antenna arrays (such as antenna array 800 of FIG. 8A) placed on opposite sides of a user equipment. In an example, multiple antenna panels can be disposed at different locations within the UE.

In an example and in reference to FIG. 1A, the node 111 can be a gNB or eNB configured to communicate in accordance with 5G and new radio (NR) communication protocols with the UE 101. In an example, the node 111 can be configured to dynamically indicate the antenna panel 190 and the Rx beam (e.g., via beam index 191) that can be used by the UE 101 for PDSCH reception, CSI-RS measurements, and CSI calculation.

In an example, the selected antenna panel 190 and the Rx beam index (191) (which can be on the selected panel) can be explicitly indicated by the node 111 to the UE 101 using control information (e.g., communicated on a new radio physical downlink control channel, or NR-PDCCH). For example, downlink control information (DCI) transmitted by the node 111 may contain the beam index 191 and the index 190 of the antenna panel that should be used by the UE for downlink (DL) reception.

In another example, the selected antenna panel index 190 and Rx beam index 191 may be indicated implicitly by association of the control channel parameters with the specific antenna panel and the Rx beam. More specifically for each configured control channel set, which the UE 101 monitors, the corresponding antenna panel and Rx beam index may be configured. After detection of the DCI transmission on the corresponding control channel set, the UE 101 can use the associated antenna panel and the Rx beam for reception of the data and/or reference signals (e.g. CSI-RS) from the node 111. In other examples, other parameters of the control channel may be used to support switching of the antenna panel and the associated Rx beam (e.g. search space, DM-RS antenna ports, and so forth).

In an example, a beam management protocol can be initiated by the node 111 by sending a CSI-RS to the UE 101. The UE 101 can respond by sending channel state information (CSI), reference signal received quality (RSRQ), or reference signal received power (RSRP). The node 111 can send a subsequent DCI transmission indicating the antenna panel and beam index for the UE to use to monitor downlink transmissions by the node. In instances when the response to the CSI-RS is RSRQ or RSRP, the UE can perform the CSI measurements using the indicated beam index and transmit CSI in a subsequent transmission.

Figure 9:
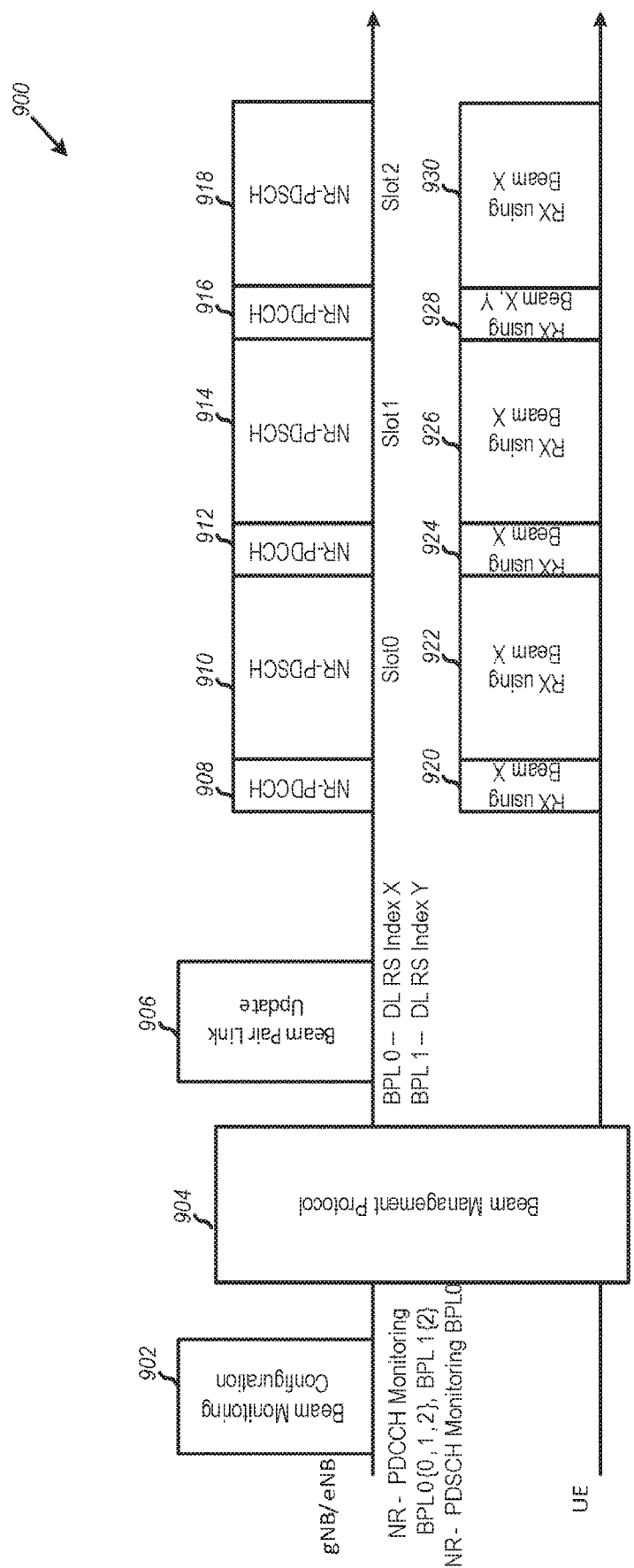
FIG. 9 illustrates example downlink beam monitoring configuration and beam pair link update procedure in accordance with some embodiments.
Figure 10:
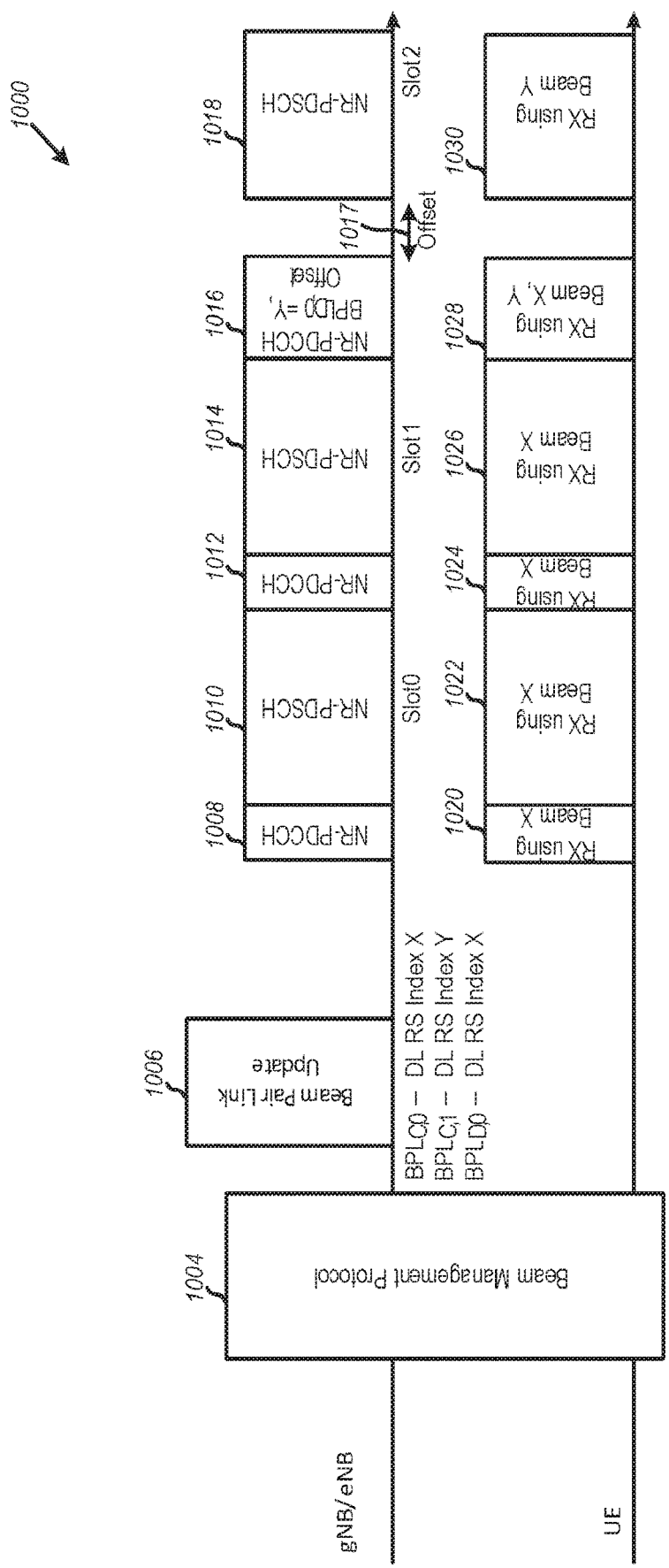
FIG. 10 illustrates example downlink beam pair link update procedure using DCI in accordance with some embodiments.

FIG. 9 illustrates example downlink beam monitoring configuration and beam pair link update procedure in accordance with some embodiments. In an example, the UE 101 can be configured to monitor NR-PDCCH using higher layer signaling, and then determine which DL RS antenna port(s) (or beam index) are associated with which beam pair link (BPL) using, e.g., a media access control (MAC) control element (CE). The beam pair link establishment or update can be done periodically or when necessary. For example, the beam index can be updated after a beam management protocol, and can be performed via network-initiated or UE-initiated beam management (e.g., as illustrated in FIG. 10).

Referring to FIGS. 1A and 9, there is illustrated a communication sequence 900 for establishing beam monitoring configuration (BMC) and performing BPL update for purposes of indicating beam index to the UE 101. The node 101 can communicate BMC 902 to the UE 101. The BMC 902 can include an indication of which BPLs (and associated beam indices) can be used by the UE for monitoring and receiving communications on certain channels. For example, the BMC 902 can indicate to the UE 101 that for NR-PDCCH monitoring, the UE can use BPL0 beam index to receive data during slots {0, 1, 2}, and BPL1 beam index to receive data during slot {2}. The BMC 902 can further indicate that beam index associated with BPL0 can be used to monitor and receive NR-PDSCH data. Beam pair link for downlink can be signaled by spatial QCL assumption between DL RS antenna port(s). In an example, NR-PDCCH monitoring configuration and beam pair link can be part of transmission parameter set 1.

In an example, beam pair link or beam index can be indicated by informing reference signal resource index or port index (RS resource index, RS port index), more particularly CSI-RS resource index, CSI-RS resource index and port index. Furthermore, SSblock (e.g. SSS or DMRS of PBCH) can be used to inform/advertise/notify about the beam index to stations. In case the UE supports beam correspondence where UE can use UE transmit beamforming information as receive beamforming information, uplink reference signal, e.g. SRS resource index (SRI), can be used to inform about the beam index. When the UE receives reference signal index which was used previously, UE can memorize corresponding receive beam, e.g. by storing phased array coefficient, and then whenever gNB indicates to use the beam (by informing BPL index), UE can use the stored phased array coefficient to form a proper receive beamforming. For simplicity, each receive beam can be referred to as beam index.

Beam management protocol (BMP) 904 can be performed subsequent to the BMC 902. During the BMP 904, beam training and acquisition can be performed so that antenna panels and corresponding beam indices are known to both the node 111 and the UE 101. Subsequent to the BMP 904, a BPL update 906 can be performed. During the BPL update 906, the node 111 can indicate specific beam indices for use with specific BPLs. For example, BPL update 906 can indicate that for BPL0 and BPL1, the UE 101 can use beam index X and beam index Y, respectively, for monitoring channels and receiving data. For example, control data can be sent by the node 111 on a NR-PDCCH 908, 912, and 916 during time slots 0, 1, and 2, respectively. Similarly, data can be sent by the node 111 on a NR-PDSCH 910, 914, and 918 during time slots 0, 1, and 2, respectively.

As seen in FIG. 9, NR-PDSCH monitoring/communication by the UE 101 at 922, 926, and 930 uses beam X, as indicated by BPL0. Additionally, NR-PDCCH monitoring/communication by the UE 101 at 920 and 924 uses only beam X (BPL0 for slots 0 and 1 as indicated by the BMC 902). NR-PDCCH monitoring/communication by the UE 101 at 928 uses both beam X and beam Y (BPL0 and BPL1 for slot 2 as indicated by the BMC 902).

In an example, NR-PDCCH and NR-PDSCH monitoring configuration can be performed by higher layer signaling using beam pair link. For example, the BMC 902 can be performed using RRC signaling.

FIG. 10 illustrates example downlink beam pair link update procedure 1000 using DCI in accordance with some embodiments. Referring to FIG. 10, beam management protocol (BMP) 1004 can be performed (e.g., subsequent to a beam monitoring configuration as seen in FIG. 9). In an example, the BMC 102 can indicate to the UE 101 that for NR-PDCCH monitoring, the UE can use BPL0 beam index to receive data during slots {0, 1, 2}, and BPL1 beam index to receive data during slot {2}. The BMC 102 can further indicate that beam index associated with BPL0 can be used to monitor and receive NR-PDSCH data.

During the BMP 1004, beam training and acquisition can be performed so that antenna panels and corresponding beam indices are known to both the node 111 and the UE 101. Subsequent to the BMP 1004, a BPL update 1006 can be performed. During the BPL update 1006, the node 111 can indicate specific beam indices for use with specific BPLs. For example, BPL update 1006 can indicate that for $BPL_{C,0}$ and $BPL_{C,1}$ (i.e., control channel communications), the UE 101 can use beam index X and beam index Y, respectively, for monitoring channels and receiving data. BPL update 1006 can also indicate that for $BPL_{D,0}$ (i.e., shared data channel communications), the UE 101 can use beam index X for monitoring channels and receiving data.

For example, control data can be sent by the node 111 on a NR-PDCCH 1008, 1012, and 1016 during time slots 0, 1, and 2, respectively. Similarly, data can be sent by the node 111 on a NR-PDSCH 1010, 1014, and 1018 during time slots 0, 1, and 2, respectively.

In an example, a BPL can be updated dynamically using, e.g., control information such as DCI. As seen in FIG. 10, the NR-PDCCH control information (e.g., DCI) can include $BPL_{D,0}$ update to indicate that the UE should use beam index Y for any subsequent transmissions on the NR-PDSCH. NR-PDSCH monitoring/communication by the UE 101 at 1022 and 1026 uses beam X (as indicated by $BPL_{D,0}$ in BPL update 1006), and NR-PDSCH monitoring at 1030 uses beam Y (as indicated by $BPL_{D,0}$ in BPL update within the NR-PDCCH 1016). Additionally, NR-PDCCH monitoring/communication by the UE 101 at 1020 and 1024 uses only beam X ($BPL_{C,0}$ for slots 0 and 1 as can be indicated by a BMC such as BMC 902). NR-PDCCH monitoring/communication by the UE 101 at 1028 uses both beam X and beam Y ($BPL_{C,0}$ and $BPL_{C,1}$ for slot 2 as can be indicated by a BMC such as BMC 902).

In an example, the DCI update of the BPL can also indicate an offset 1017 from the end of the NR-PDCCH transmission 1016, after which offset the UE can initiate monitoring of the NR-PDSCH transmission 1018.

In an example, the beam index 191 can be a transmit (Tx) beam index, and the node 111 can be configured to dynamically indicate the antenna panel 190 and the Tx beam (e.g., via Tx beam index 191) that can be used by the UE 101 for physical uplink shared channel (PUSCH) transmission and sounding reference signal (SRS) transmission.

In an example, the selected antenna panel 190 and the Tx beam index (191) (which can be on the selected panel) can be explicitly indicated by the node 111 to the UE 101 using control information (e.g., communicated on a new radio physical downlink control channel, or NR-PDCCH). For example, downlink control information (DCI) transmitted by the node 111 may contain the beam index 191 and the index 190 of the antenna panel that should be used by the UE for uplink (UL) transmission.

In an example, the order of the panel switching and the Tx beam assignment for the panel may be configured by the eNB, for example, for the SRS transmission.

In another example, the selected antenna panel index 190 and Tx beam index 191 may be indicated implicitly by association of the control channel parameters with the specific antenna panel and the Tx beam. More specifically for each configured control channel set, which the UE 101 monitors, the corresponding antenna panel and Tx beam indices may be configured. After detection of the DCI transmission on the corresponding control channel set, the UE 101 can use the associated antenna panel and the Tx beam for transmission of the data and/or reference signals (e.g. SRS) to the node 111. In other examples, other parameters of the control channel may be used to support switching of the antenna panel and the associated Tx beam (e.g. search space, DM-RS antenna ports, and so forth).

In an example, the UE 101 can be configured to use a certain beam for uplink transmission. In instances when there is activation/allocation signal for the uplink transmission, the signaling for the activation/allocation can inform the UE which Tx beam to use for the transmission. In instances when there is no activation/allocation signal for the uplink transmission, e.g. ACK/NACK channel, the Tx beam to use can be indicated implicitly or explicitly. In an example, implicit signaling can be performed by linking with a downlink beam pair link (the Tx beam can be indicated by, e.g., UL RS index). More specifically, beam pair link for an uplink connection can be signaled by UL RS antenna port(s) (signaling can be performed using MAC CE, and the beam pair link can be updated dynamically). Additionally, uplink activation/allocation signaling can be used to inform the UE, which beam pair link to use for the corresponding uplink transmission. In an example, beam pair link index for NR-PDSCH reception can be used in a corresponding ACK/NACK transmission.

Figure 11:
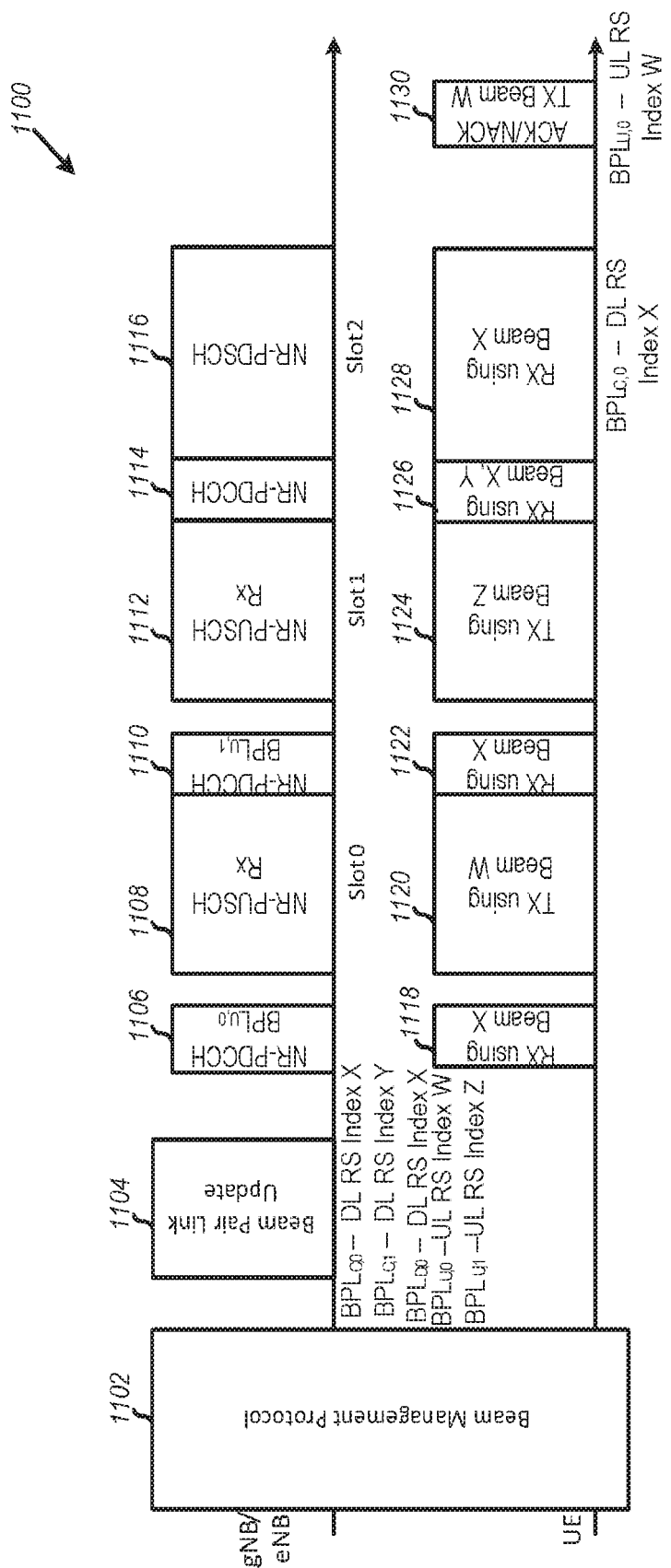
FIG. 11 illustrates example uplink beam pair link indication procedure in accordance with some embodiments.

FIG. 11 illustrates example uplink beam pair link indication procedure 1100 in accordance with some embodiments. Referring to FIGS. 1A and 11, the node 101 can communicate BMC to the UE 101 (not illustrated in FIG. 11). The BMC can include an indication of which BPLSs (and associated beam indices) can be used by the UE for receiving and transmitting communications on certain channels E.g., NR-PDSCH and NR-PUSCH).

Beam management protocol (BMP) 1102 can be performed subsequent to the BMC. During the BMP 1102, beam training and acquisition can be performed so that antenna panels and corresponding beam indices are known to both the node 111 and the UE 101. Subsequent to the BMP 1102, a BPL update 1104 can be performed. During the BPL update 1104, the node 111 can indicate specific beam indices for use with specific BPLs. For example, BPL update 1104 can indicate the following BPLs and corresponding beam indices: $BPL_{C,0}$—beam index X (for DL); $BPL_{C,1}$—beam index Y (for DL); $BPL_{D,0}$—beam index X (for DL); $BPL_{U,0}$—beam index W (for UL); and $BPL_{U,1}$—beam index Z (for UL).

In case of uplink, beam pair link or beam index can be indicated by informing or advertising/communicating reference signal resource index or port index (RS resource index, RS port index), more particularly SRS resource index (SRI), SRS resource index and port index. Furthermore, beam used using Msg.3 can be used to inform about the beam index. In case UE supports beam correspondence where UE can use UE receive beamforming information as transmit beamforming information, downlink reference signal, e.g. CSI-RS resource index can be used to inform about the beam index. When the UE receives reference signal index which was used previously, the UE can memorize corresponding transmit beam, e.g. by storing phased array coefficient, and then whenever gNB indicates to use the beam (by informing BPL index), the UE can use the stored phased array coefficient to form a proper transmit beamforming. For simplicity, each transmit beam can be referred to as beam index.

Control data can be sent by the node 111 on NR-PDCCH 1106, 1110, and 1114 during time slots 0, 1, and 2, respectively. Similarly, data can be sent by the node 111 on a NR-PDSCH 1116 during time slot 2, while the UE can send UL transmissions on NR-PUSCH 1108 and 1112 during time slots 0 and 1, respectively. For Slots 0 and 1, NR-PUSCH 1120 and 1124, as indicated by DCI in NR-PDCCH 1106 and 1110, the UE can transmit uplink data using transmit beam W and Z. For the ACK/NACK channel 1130 corresponding to NR-PDSCH 1128, the UE can use beam W, which is BPL0, corresponding to NR-PDSCH reception beam X, BPL0.

NR-PDCCH monitoring/reception by the UE 101 at 1118 and 1122 uses only beam X ($BPL_{C,0}$ for slots 0 and 1 as can indicated by the BMC). NR-PDCCH monitoring/reception by the UE 101 at 1126 uses both beam X and beam Y ($BPL_{C,0}$ and $BPL_{C,1}$ for slot 2 as can be indicated by the BMC).

Figure 12:
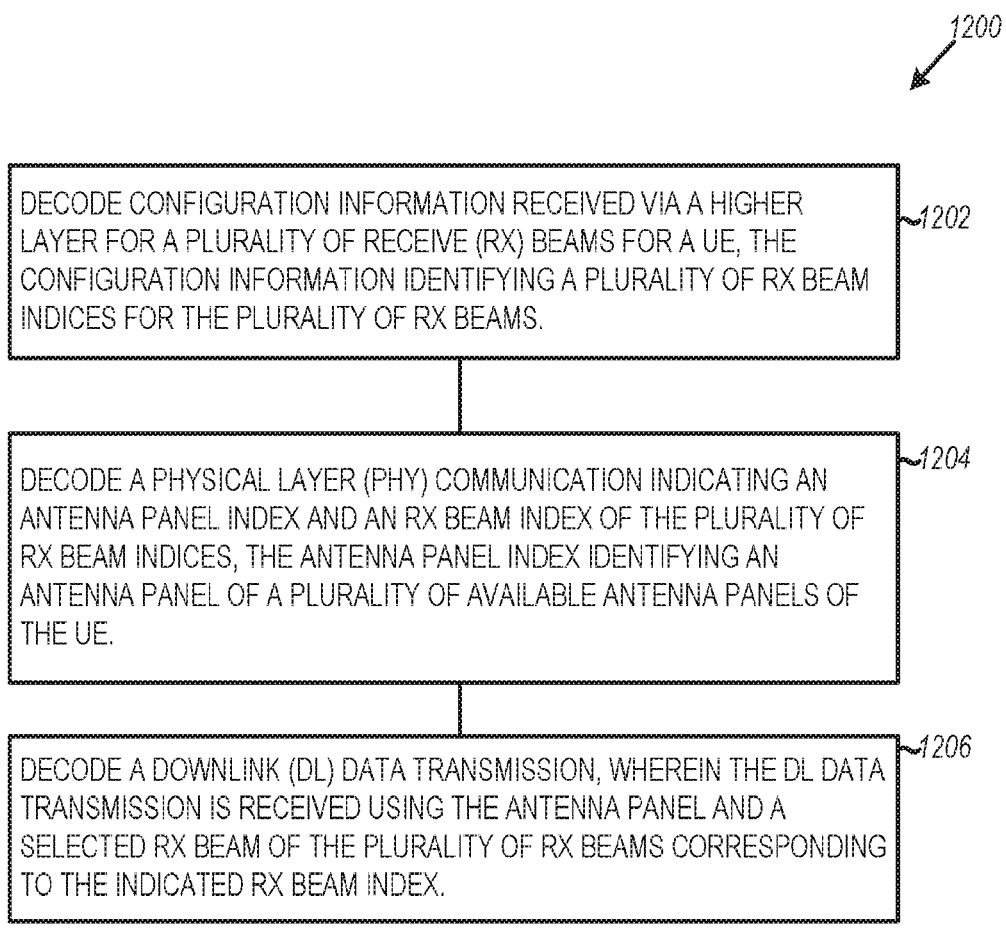
FIG. 12 is a flow diagram illustrating example functionalities for antenna panel switching and beam indication in accordance with some embodiments.

As seen in FIG. 12, periodic BPL updates can be performed using control information (e.g., DCI) transmitted by the node 111 in the NR-PDCCH (e.g., 1106 and 1110). For example, NR-PDCCH 1106 can indicate $BPL_{U,0}$ for the subsequent UL transmission 1120, so that it is performed on NR-PUSCH 1108 using beam W. NR-PDCCH 1110 can indicate $BPL_{U,1}$ for the subsequent UL transmission 1124, so that it is performed on NR-PUSCH 1112 using beam Z.

In an example, $BPL_{C,0}$ (and Rx beam X) can be indicated (e.g., in the BPL update 1104 or in a NR-PDCCH using DCI) for the DL reception 1128 within the NR-PDSCH 1116. Similarly, $BPL_{U,0}$ (and Tx beam W) can be indicated (e.g., in the BPL update 1104 or in a NR-PDCCH using DCI) for the UL ACK/NACK transmission 1130.

FIG. 12 is a flow diagram illustrating example functionalities for antenna panel switching and beam indication in accordance with some embodiments. Referring to FIG. 12, the example method 1200 may start at 1202, when configuration information can be decoded by a UE. The configuration information can be received via a higher layer for a plurality of receive (Rx) beams for the UE, and can identifying a plurality of Rx beam indices for the plurality of Rx beams. For example, the UE 101 and the node 111 can perform a beam management protocol exchange (e.g., 904) in connection with the Rx beams available to the UE. At 1204, a physical layer (PHY) communication can be decoded indicating an antenna panel index and an Rx beam index of the plurality of Rx beam indices. For example, the UE can decode DCI information received in a NR-PDCCH (or a BPL such as BPL 906) indicating antenna panel and Rx beam index information. The antenna panel index can identify an antenna panel of a plurality of available antenna panels of the UE. At 1206, a downlink (DL) data transmission can be decoded at the UE, wherein the DL data transmission is received using the antenna panel and a selected Rx beam of the plurality of Rx beams corresponding to the indicated Rx beam index. For example, the UE can receive the DL data using beam X (at 922) during the NR-PDSCH 910.

Figure 13:
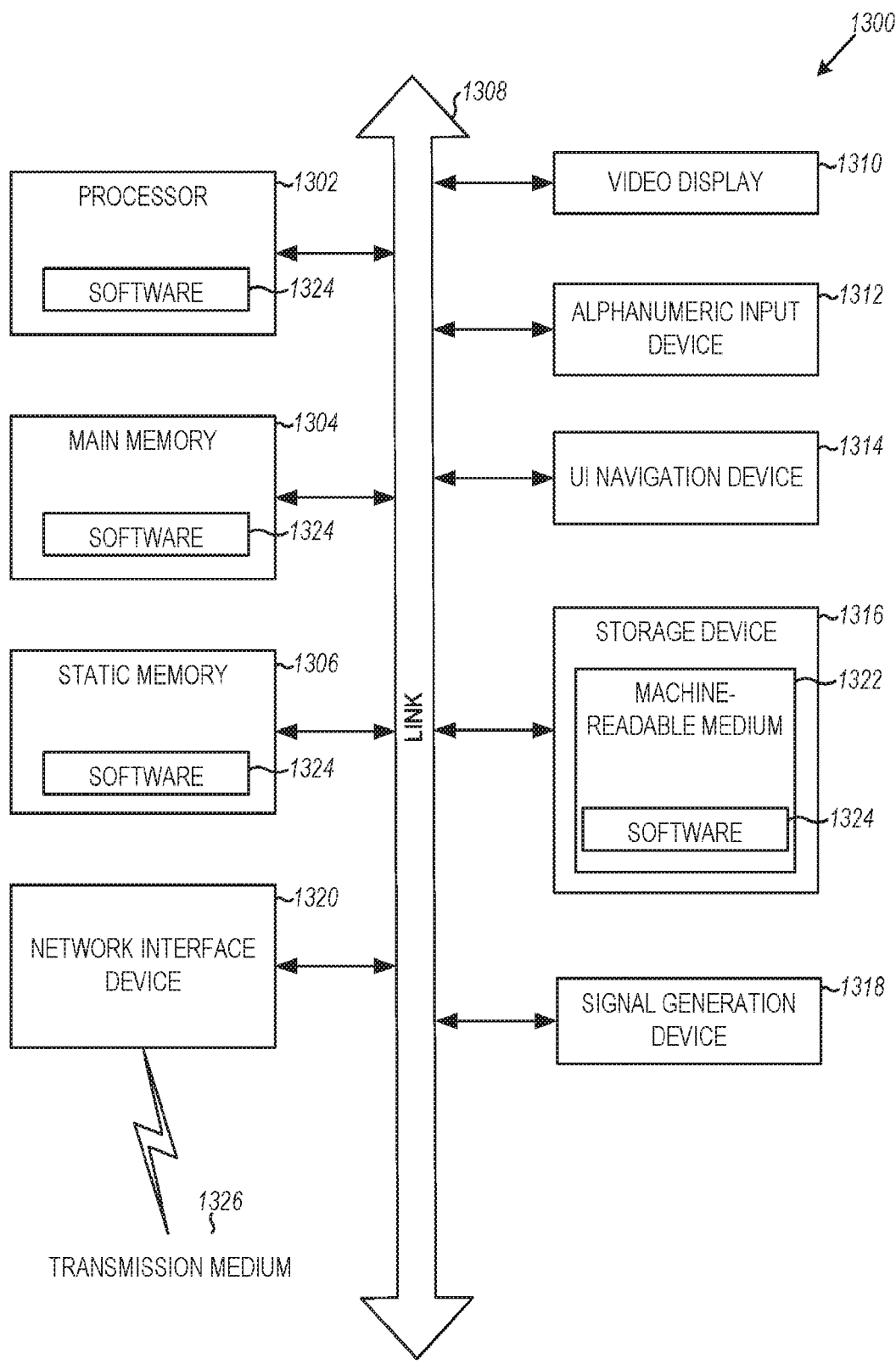
FIG. 13 illustrates a block diagram of a communication device such as an evolved Node-B (eNB), a new generation Node-B (gNB), or a user equipment (UE), in accordance with some embodiments.

FIG. 13 illustrates a block diagram of a communication device such as an eNB, a gNB, or a UE, in accordance with some embodiments. In alternative embodiments, the communication device 1300 may operate as a standalone device or may be connected (e.g., networked) to other communication devices. In a networked deployment, the communication device 1300 may operate in the capacity of a server communication device, a client communication device, or both in server-client network environments. In an example, the communication device 1300 may act as a peer communication device in peer-to-peer (P2P) (or other distributed) network environment. The communication device 1300 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The communication device 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The communication device 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The communication device 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a communication device readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the communication device 1300. In an example, one or any combination of the hardware processor 1302, the main memory 1304, the static memory 1306, or the storage device 1316 may constitute communication device readable media.

While the communication device readable medium 1322 is illustrated as a single medium, the term "communication device readable medium" may include a single medium or multiple media (e.g., a centralized or distributed database, and/or associated caches and servers) configured to store the one or more instructions 1324.

The term "communication device readable medium" may include any medium that is capable of storing, encoding, or carrying instructions for execution by the communication device 1300 and that cause the communication device 1300 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), MIMO, or multiple-input single-output (MISO) techniques. In some examples, the network interface device 1320 may wirelessly communicate using Multiple User MIMO techniques. The term "transmission medium" shall be taken to include any intangible medium that is capable of storing, encoding or carrying instructions for execution by the communication device 1300, and includes digital or analog communications signals or other intangible medium to facilitate communication of such software.

ADDITIONAL NOTES AND EXAMPLES

Example 1 is an apparatus of a user equipment (UE), the apparatus comprising: processing circuitry, the processing circuitry configured to: decode configuration information received via a higher layer signaling for a plurality of receive (Rx) beams for the UE, the configuration information identifying a plurality of Rx beam indices, each Rx beam index associated with a corresponding Rx beam of the plurality of Rx beams; decode a physical layer (PHY) communication indicating an antenna panel index and an Rx beam index of the plurality of Rx beam indices, the antenna panel index identifying an antenna panel of a plurality of available antenna panels of the UE; and decode a downlink (DL) data transmission, wherein the DL data transmission is received using the antenna panel and a selected Rx beam of the plurality of Rx beams corresponding to the indicated Rx beam index; and memory configured to store the plurality of Rx beam indices.

In Example 2, the subject matter of Example 1 optionally includes wherein the DL transmission is received on a new radio physical downlink shared channel (NR-PDSCH).

In Example 3, the subject matter of any one or more of Examples 1-2 optionally include wherein the higher layer signaling is radio resource control (RRC) signaling.

In Example 4, the subject matter of any one or more of Examples 1-3 optionally include wherein the PHY communication comprises a downlink control indicator (DCI) received on a new radio physical downlink control channel (NR-PDCCH), and wherein the antenna panel index and the Rx beam index are included in the DCI.

In Example 5, the subject matter of Example 4 optionally includes wherein the processing circuitry is further configured to: encode channel state information (CSI) measurements for the selected Rx beam for transmission to a new generation Node-B (gNB) or an evolved Node-B (eNB), based on the inclusion of the Rx beam index in the DCI.

In Example 6, the subject matter of any one or more of Examples 1-5 optionally include wherein the PHY communication: includes a higher-layer configured control channel set that is associated with the antenna panel index and the Rx beam index, wherein the control channel set includes parameters for a new radio physical downlink control channel (NR-PDCCH); and indicates the antenna panel and the selected Rx beam using scheduling information in the NR-PDCCH.

In Example 7, the subject matter of any one or more of Examples 1-6 optionally include wherein the processing circuitry is further configured to: decode channel state information reference signal (CSI-RS), wherein the CSI-RS is received using the antenna panel and the selected Rx beam; and encode CSI measurements for the selected Rx beam for transmission to a new generation Node-B (gNB) or an evolved Node-B (eNB), based on the inclusion of the Rx beam index in the PHY communication.

In Example 8, the subject matter of any one or more of Examples 1-7 optionally include wherein the configuration information comprises a beam monitoring configuration (BMC), the BMC identifying beam pair links (BPLs) for monitoring a new radio physical downlink control channel (NR-PDCCH) and a new radio physical downlink shared channel (NR-PDSCH).

In Example 9, the subject matter of Example 8 optionally includes wherein the processing circuitry is further configured to: decode a media access control (MAC) control element (CE), the MAC CE comprising a BPL update identifying, for each of the BPLs, one of the plurality of beam indices for monitoring the NR-PDCCH and the NR-PDSCH.

In Example 10, the subject matter of Example 9 optionally includes wherein the processing circuitry is further configured to: decode a second PHY communication comprising a DCI received on the NR-PDCCH, wherein the DCI includes an update to at least one of the BPLs for monitoring the NR-PDSCH and an offset indicating a subsequent data slot for initiating the monitoring.

In Example 11, the subject matter of any one or more of Examples 1-10 optionally include transceiver circuitry coupled to the processing circuitry and the plurality of available antenna panels.

Example 12 is an apparatus of a Node-B (NB), the apparatus comprising: memory; and processing circuitry, configured to: encode configuration information for a plurality of receive (Rx) beams for a user equipment (UE), the configuration information identifying a plurality of Rx beam indices for the plurality of Rx beams; encode a downlink control indicator (DCI), the DCI indicating an antenna panel index and an Rx beam index of the plurality of Rx beam indices, the antenna panel index identifying an antenna panel of a plurality of available antenna panels of the UE; and encode downlink (DL) data for transmission on a new radio physical downlink shared channel (NR-PDSCH), wherein the DL data is for reception by the UE using the antenna panel and a selected Rx beam of the plurality of Rx beams corresponding to the indicated Rx beam index.

In Example 13, the subject matter of Example 12 optionally includes wherein the NB is one of a Next Generation Node-B (gNB) or an Evolved Node-B (eNB).

In Example 14, the subject matter of any one or more of Examples 12-13 optionally include wherein the DCI is encoded for transmission to the UE on a new radio physical downlink control channel (NR-PDCCH), and wherein the antenna panel index and the Rx beam index are explicitly included in the DCI.

In Example 15, the subject matter of any one or more of Examples 12-14 optionally include wherein the processing circuitry is further configured to: decode channel state information (CSI) measurements for the selected Rx beam, based on the inclusion of the Rx beam index in the DCI.

In Example 16, the subject matter of any one or more of Examples 14-15 optionally include wherein the processing circuitry is further configured to: encode a higher-layer configured control channel set that is associated with the antenna panel index and the Rx beam index, wherein the control channel set is for transmission to the UE and includes parameters for the NR-PDCCH; and indicates the antenna panel and the selected Rx beam using scheduling information in the NR-PDCCH.

In Example 17, the subject matter of any one or more of Examples 12-16 optionally include wherein the configuration information comprises beam monitoring configuration (BMC), the BMC identifying beam pair links (BPLs) for monitoring by the UE of a new radio physical downlink control channel (NR-PDCCH) and the NR-PDSCH.

In Example 18, the subject matter of Example 17 optionally includes wherein the processing circuitry is further configured to: encode a media access control (MAC) control element (CE), the MAC CE comprising a BPL update identifying, for each of the BPLs, one of the plurality of beam indices for use by the UE to monitor the NR-PDCCH and the NR-PDSCH.

In Example 19, the subject matter of Example 18 optionally includes wherein the processing circuitry is further configured to: encode a second DCI for transmission on the NR-PDCCH, wherein the second DCI includes an update to at least one of the BPLs for monitoring the NR-PDSCH and an offset indicating a subsequent data slot for initiating the monitoring.

Example 20 is an apparatus of a user equipment (UE), the apparatus comprising: processing circuitry, the processing circuitry configured to: decode configuration information received via a higher layer for a plurality of transmit (Tx) beams for the UE, the configuration information identifying a plurality of Tx beam indices, each Rx beam index associated with a corresponding Rx beam of the plurality of Rx beams; decode a physical layer (PHY) communication indicating an antenna panel index and a Tx beam index of the plurality of beam indices, the antenna panel index identifying an antenna panel of a plurality of available antenna panels of the UE; and encode uplink (UL) data for transmission via the antenna panel and a selected Tx beam of the plurality of Tx beams corresponding to the indicated Tx beam index; and memory configured to store the plurality of Tx beam indices.

In Example 21, the subject matter of Example 20 optionally includes wherein the UL data is for transmission on a new radio physical uplink shared channel (NR-PUSCH).

In Example 22, the subject matter of any one or more of Examples 20-21 optionally include wherein the configuration information is received via radio resource control (RRC) signaling.

In Example 23, the subject matter of any one or more of Examples 20-22 optionally include wherein the PHY communication comprises a downlink control indicator (DCI) received on a new radio physical downlink control channel (NR-PDCCH), and wherein the antenna panel index and the Tx beam index are included in the DCI.

In Example 24, the subject matter of Example 23 optionally includes wherein the processing circuitry is further configured to: encode a sounding reference signal (SRS) for the selected Tx beam for transmission to a new generation Node-B (gNB) or an evolved Node-B (eNB), based on the inclusion of the Tx beam index in the DCI.

In Example 25, the subject matter of any one or more of Examples 20-24 optionally include wherein the PHY communication: includes a higher-layer configured control channel set that is associated with the antenna panel index and the Tx beam index, wherein the control channel set includes parameters for a new radio physical downlink control channel (NR-PDCCH); and implicitly indicates the antenna panel and the selected Tx beam using scheduling information in the NR-PDCCH.

In Example 26, the subject matter of any one or more of Examples 20-25 optionally include wherein the configuration information comprises beam monitoring configuration (BMC), the BMC identifying beam pair links (BPLs) for monitoring a new radio physical downlink control channel (NR-PDCCH) and a new radio physical downlink shared channel (NR-PDSCH).

In Example 27, the subject matter of Example 26 optionally includes wherein the processing circuitry is further configured to: decode a media access control (MAC) control element (CE), the MAC CE comprising a BPL update identifying, for each of the BPLs, one of the plurality of beam indices for monitoring the NR-PDCCH, the NR-PDSCH, and a new radio physical uplink shared channel (NR-PUSCH).

In Example 28, the subject matter of Example 27 optionally includes wherein the processing circuitry is further configured to: decode a second PHY communication comprising a DCI received on the NR-PDCCH, wherein the DCI includes an update to at least one of the BPLs indicating an updated beam index for transmitting uplink data on the NR-PUSCH.

In Example 29, the subject matter of any one or more of Examples 20-28 optionally include transceiver circuitry coupled to the processing circuitry and the plurality of available antenna panels.

Example 30 is a computer-readable storage medium that stores instructions for execution by one or more processors of a user equipment (UE), the one or more processors to configure the UE to: decode configuration information received via a higher layer signaling for a plurality of receive (Rx) beams for the UE, the configuration information identifying a plurality of Rx beam indices, each Rx beam index associated with a corresponding Rx beam of the plurality of Rx beams; decode a physical layer (PHY) communication indicating an antenna panel index and an Rx beam index of the plurality of Rx beam indices, the antenna panel index identifying an antenna panel of a plurality of available antenna panels of the UE; and decode a downlink (DL) data transmission, wherein the DL data transmission is received using the antenna panel and a selected Rx beam of the plurality of Rx beams corresponding to the indicated Rx beam index.

In Example 31, the subject matter of Example 30 optionally includes wherein the DL transmission is received on a new radio physical downlink shared channel (NR-PDSCH).

In Example 32, the subject matter of any one or more of Examples 30-31 optionally include wherein the higher layer signaling is radio resource control (RRC) signaling.

In Example 33, the subject matter of any one or more of Examples 30-32 optionally include wherein the PHY communication comprises a downlink control indicator (DCI) received on a new radio physical downlink control channel (NR-PDCCH), and wherein the antenna panel index and the Rx beam index are included in the DCI.

In Example 34, the subject matter of Example 33 optionally includes wherein the one or more processors further configure the UE to: encode channel state information (CSI) measurements for the selected Rx beam for transmission to a new generation Node-B (gNB) or an evolved Node-B (eNB), based on the inclusion of the Rx beam index in the DCI.

Example 35 is an apparatus of a user equipment (UE), the apparatus comprising: means for decoding configuration information received via a higher layer signaling for a plurality of receive (Rx) beams for the UE, the configuration information identifying a plurality of Rx beam indices, each Rx beam index associated with a corresponding Rx beam of the plurality of Rx beams; means for decoding a physical layer (PHY) communication indicating an antenna panel index and an Rx beam index of the plurality of Rx beam indices, the antenna panel index identifying an antenna panel of a plurality of available antenna panels of the UE; and means for decoding a downlink (DL) data transmission, wherein the DL data transmission is received using the antenna panel and a selected Rx beam of the plurality of Rx beams corresponding to the indicated Rx beam index.

In Example 36, the subject matter of Example 35 optionally includes wherein the DL transmission is received on a new radio physical downlink shared channel (NR-PDSCH).

In Example 37, the subject matter of any one or more of Examples 35-36 optionally include wherein the higher layer signaling is radio resource control (RRC) signaling.

In Example 38, the subject matter of any one or more of Examples 35-37 optionally include wherein the PHY communication comprises a downlink control indicator (DCI) received on a new radio physical downlink control channel (NR-PDCCH), and wherein the antenna panel index and the Rx beam index are included in the DCI.

In Example 39, the subject matter of Example 38 optionally includes means for encoding channel state information (CSI) measurements for the selected Rx beam for transmission to a new generation Node-B (gNB) or an evolved Node-B (eNB), based on the inclusion of the Rx beam index in the DCI.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. An apparatus, comprising:
a processor configured to cause a user equipment device (UE) to:
  decode configuration information received via a higher layer signaling for a plurality of receive (Rx) beams for the UE, the configuration information identifying a plurality of first indices, wherein a respective first index is associated with a respective Rx beam of the plurality of Rx beams;
  decode a physical layer (PHY) communication associated with a second index and a particular first index of the plurality of first indices, the second index identifying an antenna panel of a plurality of available antenna panels of the UE and the particular first index identifying a particular Rx beam of the plurality of Rx beams; and decode a downlink (DL) data transmission, wherein the DL data transmission is received using the antenna panel and the particular Rx beam.

2. The apparatus of claim 1, wherein the DL data transmission is received on a new radio physical downlink shared channel (NR-PDSCH).

3. The apparatus of claim 1, wherein the higher layer signaling is radio resource control (RRC) signaling.

4. The apparatus of claim 1, wherein the PHY communication comprises a downlink control indicator (DCI) received on a new radio physical downlink control channel (NR-PDCCH), and wherein the second index and the particular first index are included in the DCI.

5. The apparatus of claim 4, wherein the processor is further configured to:
encode channel state information (CSI) measurements for the particular Rx beam for transmission to a new generation Node-B (gNB) or an evolved Node-B (eNB), based on the inclusion of the particular first index in the DCI.

6. The apparatus of claim 1, wherein the PHY communication:
includes a higher-layer configured control channel set that is associated with the antenna panel index and the particular first index, wherein the control channel set includes parameters for a new radio physical downlink control channel (NR-PDCCH); and
indicates the antenna panel and the particular RX beam using scheduling information in the NR-PDCCH.

7. The apparatus of claim 1, wherein the processor is further configured to:
decode channel state information reference signal (CSI-RS), wherein the CSI-RS is received using the antenna panel and the particular RX beam; and
encode CSI measurements for the particular RX beam for transmission to a new generation
Node-B (gNB) or an evolved Node-B (eNB), based on an inclusion of the particular first index in the PHY communication.

8. The apparatus of claim 1, wherein the configuration information comprises a beam monitoring configuration (BMC), the BMC identifying beam pair links (BPLs) for monitoring a new radio physical downlink control channel (NR-PDCCH) and a new radio physical downlink shared channel (NR-PDSCH).

9. The apparatus of claim 8, wherein the processor is further configured to:
decode a media access control (MAC) control element (CE), the MAC CE comprising a BPL update identifying, for each of the BPLs, one of the plurality of first indices for monitoring the NR-PDCCH and the NR-PDSCH.

10. The apparatus of claim 9, wherein the processor is further configured to:
decode a second PHY communication comprising a DCI received on the NR-PDCCH, wherein the DCI includes an update to at least one of the BPLs for monitoring the NR-PDSCH and an offset indicating a subsequent data slot for initiating the monitoring.

11. The apparatus of claim 1, wherein the PHY communication is decoded according to a higher-layer configured control channel set that is associated with the first index and the second index, wherein the control channel set includes parameters for a new radio physical downlink control channel (NR-PDCCH).

12. An apparatus, comprising:
a processor configured to cause a base station to:
transmit, to a user equipment device via higher layer signaling, configuration information for a plurality of receive (Rx) beams for the UE, the configuration information identifying a plurality of first indices, wherein a respective first index is associated with a respective Rx beam of the plurality of Rx beams;
transmit, to the UE, a physical layer (PHY) communication associated with a second index and a particular first index of the plurality of first indices, the second index identifying an antenna panel of a plurality of available antenna panels of the UE and the particular first index identifying a particular Rx beam of the plurality of Rx beams; and
transmit, to the UE, a downlink (DL) data transmission, wherein the DL data transmission is received using the antenna panel and the particular Rx beam.

13. The apparatus of claim 12, wherein the DL data transmission is transmitted on a new radio physical downlink shared channel (NR-PDSCH).

14. The apparatus of claim 12, wherein the higher layer signaling is radio resource control (RRC) signaling.

15. The apparatus of claim 12, wherein the PHY communication comprises a downlink control indicator (DCI) on a new radio physical downlink control channel (NR-PDCCH), and wherein the second index and the particular first index are included in the DCI.

16. The apparatus of claim 15, wherein the processor is further configured to:
receive, from the UE, channel state information (CSI) measurements for the particular Rx beam, based on the inclusion of the particular first index in the DCI.

17. The apparatus of claim 12, wherein the PHY communication:
includes a higher-layer configured control channel set that is associated with the antenna panel index and the particular first index, wherein the control channel set includes parameters for a new radio physical downlink control channel (NR-PDCCH); and
indicates the antenna panel and the particular RX beam using scheduling information in the NR-PDCCH.

18. The apparatus of claim 12, wherein the processor is further configured to:
transmit channel state information reference signal (CSI-RS); and
receive, from the UE, CSI measurements for the particular RX beam based on an inclusion of the particular first index in the PHY communication.

19. The apparatus of claim 12, wherein the configuration information comprises a beam monitoring configuration (BMC), the BMC identifying beam pair links (BPLs) for monitoring a new radio physical downlink control channel (NR-PDCCH) and a new radio physical downlink shared channel (NR-PDSCH).

20. The apparatus of claim 19, wherein the processor is further configured to:
transmit, to the UE, a media access control (MAC) control element (CE), the MAC CE comprising a BPL update identifying, for each of the BPLs, one of the plurality of first indices for monitoring the NR-PDCCH and the NR-PDSCH.

21. The apparatus of claim 20, wherein the processor is further configured to:
transmit, to the UE, a second PHY communication comprising a DCI on the NR-PDCCH, wherein the DCI includes an update to at least one of the BPLs for monitoring the NR-PDSCH and an offset indicating a subsequent data slot for initiating the monitoring.

22. The apparatus of claim 12, wherein the PHY communication is encoded according to a higher-layer configured control channel set that is associated with the first index and the second index, wherein the control channel set includes parameters for a new radio physical downlink control channel (NR-PDCCH).

23. A user equipment device (UE), comprising:
a radio; and
a processor operably connected to the radio and configured to cause the UE to:
  decode configuration information received via a higher layer signaling for a plurality of receive (Rx) beams for the UE, the configuration information identifying a plurality of first indices, wherein a respective first index is associated with a respective Rx beam of the plurality of Rx beams;
  decode a physical layer (PHY) communication associated with a second index and a particular first index of the plurality of first indices, the second index identifying an antenna panel of a plurality of available antenna panels of the UE and the particular first index identifying a particular Rx beam of the plurality of Rx beams; and
  decode a downlink (DL) data transmission, wherein the DL data transmission is received using the antenna panel and the particular Rx beam.

24. The UE of claim 23, wherein the PHY communication comprises a downlink control indicator (DCI) received on a new radio physical downlink control channel (NR-PDCCH), and wherein the second index and the particular first index are included in the DCI.

25. The UE of claim 23, wherein the PHY communication is decoded according to a higher-layer configured control channel set that is associated with the first index and the second index, wherein the control channel set includes parameters for a new radio physical downlink control channel (NR-PDCCH).

* * * * *